UNITED STATES PATENT OFFICE.

BENJAMIN RICE FAUNCE, OF PHILADELPHIA, PENNSYLVANIA.

PROCESS OF MAKING CAFFEIN.

SPECIFICATION forming part of Letters Patent No. 716,878, dated December 30, 1902.

Application filed June 3, 1902. Serial No. 110,040. (No specimens.)

*To all whom it may concern:*

Be it known that I, BENJAMIN RICE FAUNCE, a citizen of the United States, residing at Philadelphia, in the county of Philadelphia and State of Pennsylvania, have invented new and useful Improvements in the Art or Process of Manufacturing Caffein, of which the following is a specification.

This invention relates to the process of manufacturing caffein from the by-products of roasted coffee, and has for its object to simplify and cheapen said process by using heat to volatilize some substances and to convert others into insoluble carbon and gases, thus effecting a saving in the use of chemicals.

In extracting caffein from tea and coffee it becomes necessary to separate the caffein from the volatile oils, tannic acid, coloring-matter, &c., found in the tea-leaf or coffee-bean, and this has hitherto been effected by exhausting the tea or coffee with boiling water, treating the resultant solution with lead acetate to separate the tannic acid and coloring-matter, filtering, decomposing the lead by hydrogen sulfid, neutralizing with ammonia, and concentrating by evaporation. The caffein then separates on cooling and is further purified by recrystallization or treating with animal charcoal. Another process has heretofore been to exhaust the tea or coffee with boiling water, treat the resultant solution with lead acetate, evaporate to dryness, and sublime. Now the roasting of coffee vaporizes a portion of the caffein and volatile oils, which accumulate with dust in the form of a crust in the pipes and flues of coffee-roasters. This accumulation sometimes contains as high as eight per cent. of caffein. It contains also a considerable amount of oils and soluble coloring-matter, which heretofore have caused it to be discarded, because the existing processes for utilizing this accumulation require a large amount of chemicals and consequent expense. Instead of depending upon the above-mentioned chemical processes I substitute a process which is largely mechanical. I place this accumulation from said pipes and flues in an inclosed vessel with a small outlet. I then apply heat to said inclosed vessel containing the accumulation, thereby volatilizing the oils along with a portion of the caffein. I then condense the volatilized oils and caffein and place the matter so condensed in boiling water, which separates the oils from the caffein, the oils floating on the top of the water and the caffein being held in solution in the water. I then separate the oils by means of a wet filter. The heat which I have applied to said inclosed vessel, besides volatilizing the oils and caffein, as stated, also decomposes a large proportion of the coloring-matter into insoluble carbon and gases. The gases pass off, and the carbon remains in a solid state as part of the charred material in the inclosed vessel. The charred material which remains in the inclosed vessel contains a considerable proportion of caffein. I place this charred material in boiling water, which extracts the caffein and some coloring-matter and holds it in solution. Both caffein solutions are united before evaporation to crystallize. The solution obtained from the boiling of the charred material is then filtered to separate the carbon and other impurities and is allowed to evaporate, whereupon the caffein crystallizes out. The crystals so obtained are further purified by crystallization or sublimation.

The advantages gained by this process are as follows:

First. By volatilizing the oils in the first stage of the process the residuum is readily treated with boiling water, whereas if the boiling water were applied before extracting the oils the substance would swell up and form a bulky mass very difficult of treatment.

Second. By applying dry heat in the first stage of the process I decompose most of the soluble coloring-matter, converting it into insoluble carbon and gases. The gases pass off, and when the charred material is treated with water and filtered the insoluble carbon is separated from the caffein. This separation of the caffein from the coloring-matter has hitherto been a very costly part of the process, as hitherto it has necessitated the use of lead acetate or other chemicals.

Third. I utilize and render profitable the accumulation on the inside of the flues and pipes of coffee-roasters, which hitherto has been wasted.

Fourth. I substitute a cheap process largely mechanical for an expensive process largely chemical.

What I claim as my invention, and desire to secure by Letters Patent, is—

The process of manufacturing caffein from the deposit on the inside of the pipes and flues of coffee-roasters, by heating said deposit, condensing the resultant vapors, placing the condensed matter in boiling water, separating out the oily matter, boiling in water the charred residuum of the first heating process, filtering the resultant solution, uniting both caffein solutions, crystallizing the caffein by evaporation, and further purifying the caffein by crystallization or sublimation, substantially as herein described.

In testimony whereof I have signed my name to this specification in the presence of two subscribing witnesses.

BENJAMIN RICE FAUNCE.

Witnesses:
   CIPRIANO ANDRADE, Jr.,
   M. WALTER MILLER.